Patented Oct. 8, 1929

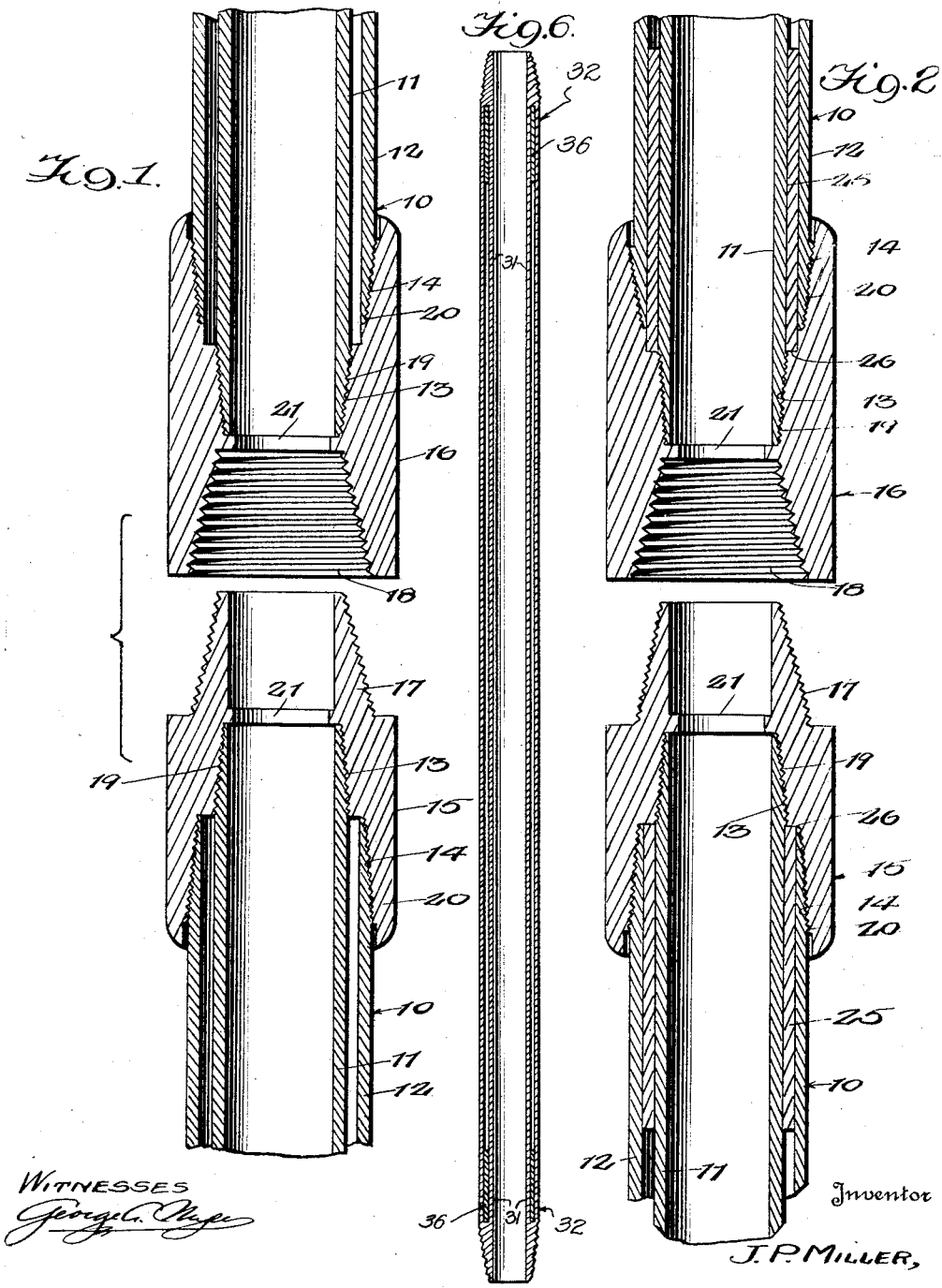

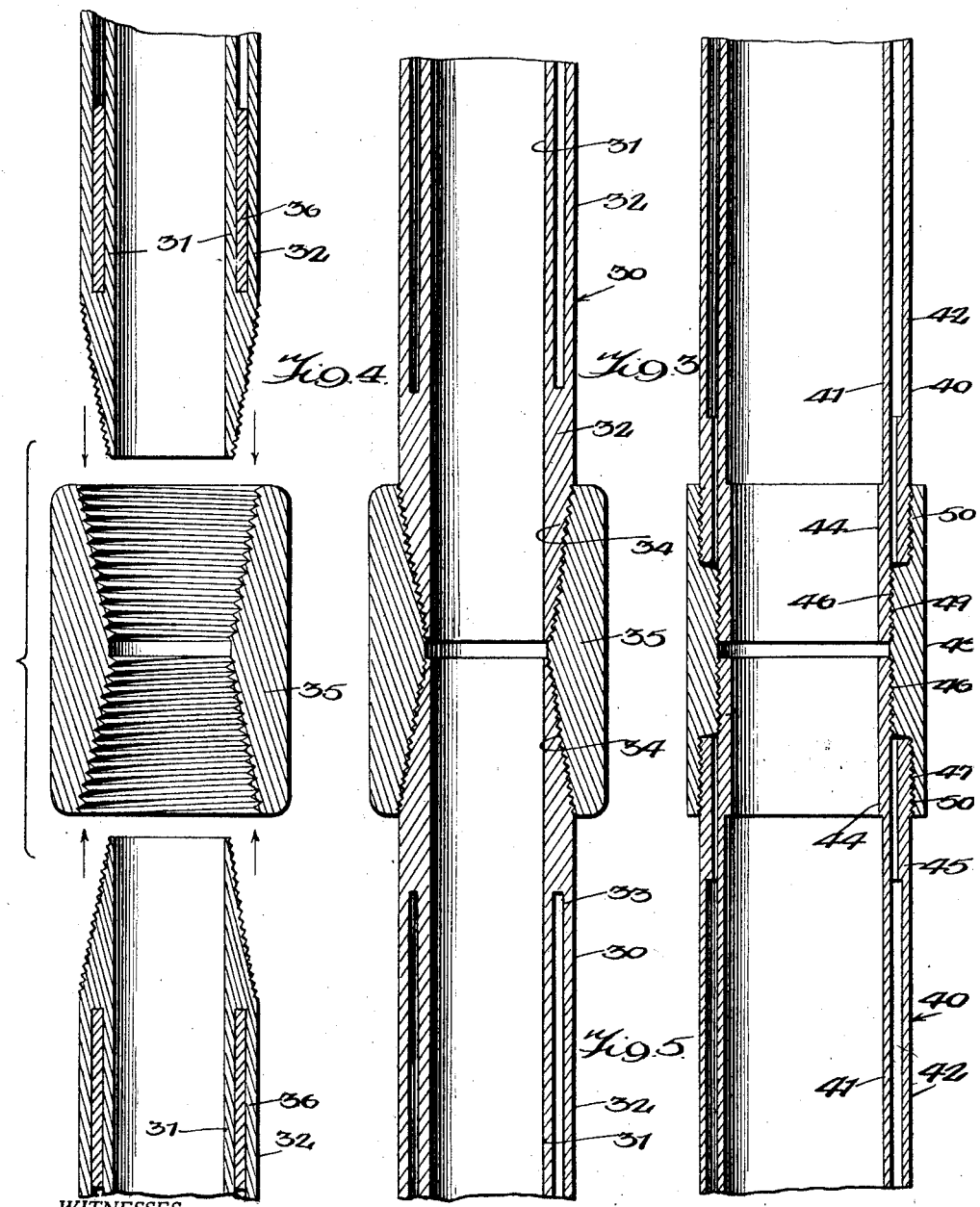

1,731,171

UNITED STATES PATENT OFFICE

JESSE PERKINS MILLER, OF HOUMA, LOUISIANA, ASSIGNOR OF ONE-HALF TO JOSEPH HUNTER THATCHER, OF HOUMA, LOUISIANA

DRILL STEM

Application filed September 15, 1924. Serial No. 737,873.

This invention relates to an improvement in drill stem for use with well equipment and has for its object to provide a drill stem which will stand a maximum of vibration and which will be of strong durable construction, reliable and effective in operation, and while comparatively expensive to manufacture is well worth the cost.

Other objects and advantages of the invention reside in certain novel features of the construction, combination and arrangement of parts which will be hereinafter more fully described and particularly pointed out in the appended claims, reference being had to the accompanying drawings forming part of this specification, and in which:

Figure 1 is a fragmentary view in vertical section, showing one embodiment of the invention;

Figure 2 is a similar view of another embodiment of the invention;

Figure 3 is a similar view of still another form of the invention;

Figure 4 is a similar view of a still further modified form of the invention;

Figure 5 is a similar view of another form of the invention, and

Figure 6 is a longitudinal sectional view of one of the drill stem sections of the form of the invention exhibited in Figure 4.

Referring to the drawings and more particularly to Figure 1, it will be seen that the invention provides a drill stem made up of a number of sections 10. The sections 10 are of identical construction and each comprises a plurality of tubular members 11 and 12 such as metallic pipes. The tubular members may be provided in any desired number and are arranged one within the other in spaced concentric relation. The ends of the tubular members are positively and rigidly secured together but the intermediate portions thereof are left free to partake of vibration independent of each other. The tubular members may be relatively light pipes and preferably they are since it is found that light pipes are better able to stand heavy strains, stresses and vibration without fatigue or crystallization and yet in the organization forming the subject-matter of this invention the requisite degree of strength and durability is had.

In the form of the invention shown in Figure 1 the ends of the pipes 11 and 12 are externally threaded, as at 13 and 14, respectively. In the assembly, the sections 10 are coupled together, and in order to provide for the coupling and also for the securing of the pipes 11 and 12 as above set forth, coupling members 15 and 16 are provided. The coupling member 15 is provided with a reduced and externally threaded extension 17 adapted to engage an internally threaded socket 18 in the coupling member 16. Except for the elements 17 and 18 the coupling members 15 and 16 are of identical construction and each is provided with internally threaded steps, designated at 19 and 20, the internally threaded step 19 being engaged with the externally threaded end of the pipe 11 and the internally threaded step 20 being engaged with the externally threaded end 14 of the pipe 12 whereby the pipes 11 and 12 are rigidly and positively secured in spaced and concentric relation.

The form of the invention shown in Figure 2 is identical with that shown in Figure 1 except that sleeves 25 are forced into the spaces between the pipes 10 and 11 at the ends thereof, the sleeves being tightly fitted in these spaces and abutting shoulders 26 provided on the coupling members. The purpose of these sleeves is to prevent break out tongues or rotary slips from denting the pipe.

In the form of the invention shown in Figure 3 the drill stem includes as before a number of sections, designated generally at 30. Each section 30 is made up of a plurality of pipes, designated at 31 and 32, the pipes being threaded one within the other in spaced and concentric relation and being of comparatively light weight construction. The ends of the pipes are welded together as at 33, in order to positively and rigidly secure the ends together while leaving the intermediate portions of the pipes free to partake of vibration independent of each other. A coarse tapered thread 34 is formed on each welded end of the pipe, and these externally threaded tapered ends 34 co-act with the internally threaded coupling sleeve 35 whereby the sections are coupled in assembly.

The form of the invention shown in Figure 4 is identical with that shown in Figure 3 except that spacing and reinforcing sleeves 36 are forced into the spaces between the pipes 31 and 32 prior to the welding and threading. When the welding has been completed not only are the pipes 31 and 32 welded together but a portion of each sleeve 36 is welded to portions of the pipes with which it is associated. One of the sections 32 with the spacing and reenforcing sleeves in the end portions thereof is shown in Figure 6

In the form of the invention shown in Figure 5 the drill stem is made up of a number of sections designated generally at 40, and each section includes a plurality of relatively light pipes, designated at 41 and 42. The pipes 41 and 42 are arranged one within the other in spaced concentric relation. The ends of the pipes 41 and 42 are enlarged internally, as at 44 and 45 and are threaded externally, as at 46 and 47. In order to provide for the coupling of the sections and for the securing of the pipes making up each section in spaced relation a coupling sleeve 48 is provided and has an internally threaded step 49 engageable with the externally threaded ends 46 of the pipes 41. This coupling sleeve 48 also has internally threaded steps 50 engageable with the externally threaded stems 47 of the pipes 42. With this arrangement the sections of the stem are coupled together and the pipes of each section are secured at their ends in a positive and ready manner although the intermediate portions of the pipes of each section are left free to partake of vibration independent of each other.

The drill stems constructed in accordance with the present invention are well adapted for use in deep hard formations and they have the requisite strength to withstand the high strains without danger of crystallization or fatigue of the pipes making up the stem. Moreover, the weight of the stem is kept within proper limit. These advantages are considered to result from the facts that thin pipes will stand more vibration than thick pipe and from the further fact that the thin pipe or relatively light pipe used in the drill stem constituting the present invention is organized into a unitary construction having the requisite strength and durability. In all forms of the invention the ends of the pipe are positively and rigidly secured together but the intermediate portions of the pipe are left free and may be vibrated or flexed to some extent independently of each other.

I claim:

1. In a drill, a pair of longitudinally alined cylindrical members having stepped concentric openings, a plurality of concentric tubes received and held in the concentric openings, the major length of the tubes being slightly spaced to permit independent flexing of each of the tubes while the end portions thereof are in contacting relation to lend rigidity to the structure adjacent the cylindrical members.

2. In a drill section, a plurality of concentric tubes arranged in spaced relation for the major part of their length to permit independent flexing of each of the latter and having their ends arranged in contacting relation, cylindrical coupling members at the ends of the tubes and having stepped concentric openings therein in which the extreme ends of the tubes are rigidly secured.

3. A built-up drill collar having a body comprising an inner tube with an outer tube telescoped over the inner tube, and a head at each end connected to the two tubes, said heads having means for connecting the same respectively to the drill string and the drill bit.

4. A built-up drill collar having a body comprising an inner tube with an outer tube telescoped over the inner tube, and a head at each end connected to the two tubes, said heads having means for connecting the same respectively to the drill string and the drill bit, the wall of said drill collar being constructed so that the walls of said tubes are rigidly connected together at each end of the drill collar adjacent the heads, said walls having an annular space between them at the intermediate portion of the body.

5. The method of making a built-up drill collar, which consists in attaching a head to an inner tube, placing a spacer ring over the inner tube adjacent the head, telescoping an outer tube over the inner tube with its end over the spacer ring, and welding the walls of the tubes to the spacer ring.

JESSE PERKINS MILLER.